Dec. 31, 1968  L. J. HAYHURST ET AL  3,419,400
PACKAGING FOODS-PRODUCTION OF OXYGEN-FREE PACKAGES
Filed Oct. 22, 1965
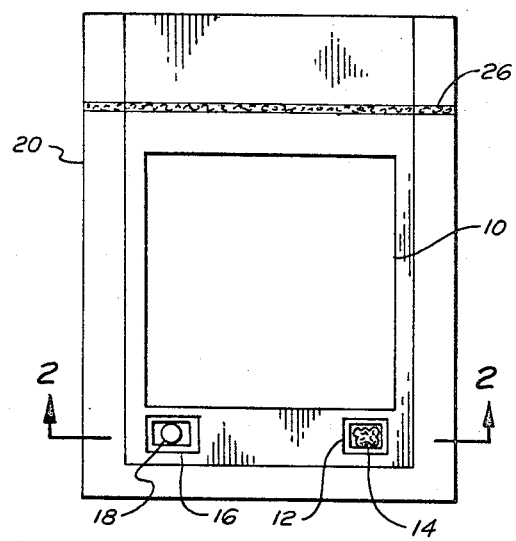
Fig. 1
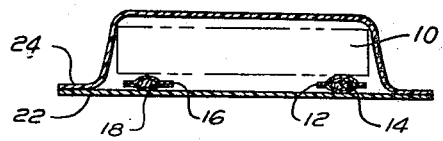
Fig. 2
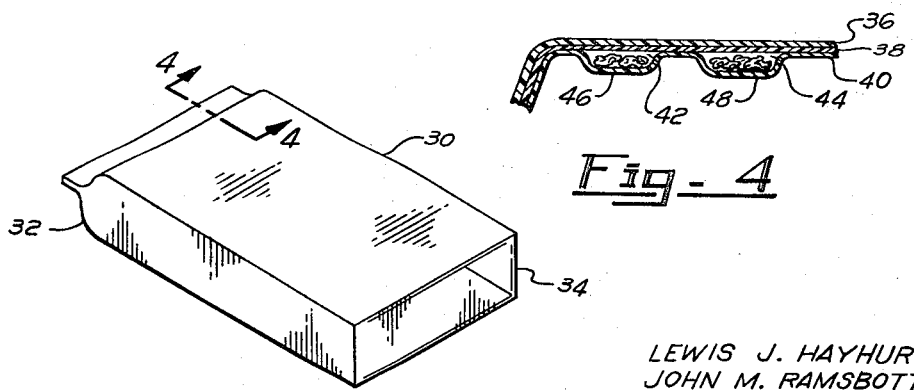
Fig. 4
Fig. 3
LEWIS J. HAYHURST
JOHN M. RAMSBOTTOM
JOSEPH B. CRAINE
     INVENTORS.
BY *Edward N McCabe*
ATTORNEY.

United States Patent Office
3,419,400
Patented Dec. 31, 1968

3,419,400
PACKAGING FOODS—PRODUCTION OF
OXYGEN-FREE PACKAGES
Lewis J. Hayhurst, Glenview, and John M. Ramsbottom and Joseph B. Craine, Chicago, Ill., assignors to Swift & Company, Chicago, Ill., a corporation of Illinois
Filed Oct. 22, 1965, Ser. No. 501,935
6 Claims. (Cl. 99—171)

ABSTRACT OF THE DISCLOSURE

A product is protected against oxygen-induced deterioration by packaging the product in a gas impermeable container with an agent which generates hydrogen on contact with water, water and a water-synthesis catalyst so that the hydrogen can react with any free oxygen present.

This invention relates to the packaging of oxygen-deteriorative products and more particularly to a method of packaging, to an envelope for use in forming an oxygen-free package, and to the package formed thereby wherein the effects of free oxygen on the product can be precluded.

Oxygen is well known to have a deleterious effect on many products. It corrodes many metals and affects the color and flavor of food products. The effects on cured meat products are particularly undesirable; oxygen reacts with cured meat pigments in the presence of light thereby discoloring the meat and also reacts with natural fats to produce odors which are objectionable to the consumer. Oxygen also promotes the growth of molds in food products such as cheese.

Prior art methods for excluding oxygen have involved mechanical means, including vacuum and inert gas packaging. In these procedures the oxygen is removed by displacement of the entire atmospheric mixture in the package by vacuumizing or flushing and in some instances the package is backfilled with an inert gas. These methods do not quantitatively remove all oxygen because the evacuation is never complete and oxygen often remains dissolved and/or trapped in the packaged product. Also, when an inert gas backfill is used the inert gas often brings traces of oxygen back into the package. The previous methods, especially where inert gas handling is involved, have required machines of considerable cost and sophistication for high speed packaging.

It is extremely difficult to remove all traces of oxygen from packages of food products by mechanical means. In order to preserve the color and flavor of products such as cured meats, it is necessary to remove even the last traces of oxygen from the package and the package must be maintained oxygen-free throughout the desired shelf-life of the product. In this regard, small amounts of oxygen permeate many of the relatively gas-impermeable flexible packaging materials presently available commercially.

Methods for removing free oxygen from a closed package containing a moist food product by an enzyme system have been proposed. These procedures require storage of cured meats in the dark for long periods of time for the slow biological oxygen removal to take place, usually for at least one day. Another drawback to these methods is the possibility of the enzyme contacting the meat product which produces a very undesirable greenish-brown colored meat surface.

It is, therefore, an object of this invention to provide an improved method for packaging of oxygen-deteriorative product wherein residual free oxygen is removed from the package.

A further object of the invention is to provide a package which will remain oxygen-free for the desired storage period of a food product.

A still further object of the invention is the provision of an improved method for packaging food products wherein oxygen is rapidly removed from the package by reaction with hydrogen generated within the package.

Another object of the invention is to provide a sealed film package for food products wherein free oxygen is effectively removed.

A further object of the invention is to provide a film envelope which is suitable for forming an oxygen-free package.

Other objects and features of the invention will appear from the following description and drawings.

In accordance with the present method, oxygen-deteriorative products are hermetically packaged and the packaged product is protected from the adverse effects which free oxygen would have on the product through the generation within the package of hydrogen gas by chemical reaction. Free oxygen is effectively removed from the package by combination with the generated hydrogen in the presence of a suitable catalyst to form water.

The product may be inserted into an envelope or wrapper containing a hydrogen generating agent and a catalyst. Alternatively, an envelope may be formed about the product, hydrogen generating agent and catalyst and subsequently sealed to form the package of the invention.

Referring to the drawings:
FIGURE 1 is a plan view of one embodiment of the package of this invention.
FIGURE 2 is a sectional view of the package of FIGURE 1 taken along line 2—2 of FIGURE 1.
FIGURE 3 is a perspective view of a container including a hydrogen generating agent and a catalyst which is suitable for forming a package for an oxygen deteriorative product.
FIGURE 4 is an enlarged sectional view, the section being taken along line 4—4 of FIGURE 3.

More specifically, the method of the present invention involves hermetically sealing products which are adversely affected by oxygen within wrappers or containers which are substantially oxygen-impermeable and thereafter eliminating the residual free oxygen from the package. Hydrogen gas is generated by chemical reaction of a hydrogen generating agent and water within the sealed package. This generated hydrogen is combined with the free oxygen present within the packages in the presence of a suitable catalyst to form water, thereby effectively eliminating free oxygen from within the package.

The present method may be practiced by sealing the product, the hydrogen generating agent, and the catalyst within a preformed substantially oxygen-impermeable container such as a flexible film package. Also contemplated are composite packages formed partly of rigid materials and partly of flexible films. For instance, in packaging bacon a rigid tray may be used to hold the limp bacon draft and then covered with a film material. Where structural strength of the package for resistance to handling damage is important, an oxygen-impermeable film package may be subsequently encased in a rigid member such as a drum or pasteboard box.

A variety of procedures may be utilized in forming and sealing the package. The steps of forming a container or envelope and inserting the product, hydrogen generating reactants and catalyst into the envelope or container may be performed in the order most convenient for the particular package desired. Many configurations of film envelopes and most rigid containers such as tin cans are preferably formed prior to insertion of the product, hydrogen generating reactants, and catalyst into the container or wrapper. In certain applications film envelopes may advantageously be formed about the above-listed materials by procedures well known in the art. Also, formation of a film envelope containing the hydrogen generating reactant and the catalyst for subsequent insertion of a food product is contemplated.

Sealing of the envelope about the contents may be performed by heat sealing or other film sealing procedures which result in a substantially oxygen-impermeable package. In the practice of the invention, it is not necessary to vacuumize or flush the container prior to sealing. Indeed, vacuumizing can, in some cases, hinder the removal of the total amount of residual free oxygen by isolating gas pockets from the catalyst used in the instant method due to collapsing of a film wrapper tightly against the product. This film collapse does not generally present a problem in the practice of the instant method because the generated hydrogen expands the outer envelope and in most package configurations ensures free movement of gases about the product.

Relatively small amounts of hydrogen generating agent can produce large volumes of hydrogen sufficient to completely remove oxygen from the package. A quantity of material which will produce hydrogen in at least double the amount of residual free oxygen should be used. When highly reactive hydrogen generating agents are used and a source of water is readily available thereto it is preferable to seal the package immediately after insertion of the hydrogen generating material to avoid escape of hydrogen.

The elimination of the need to vacuumize or flush the container prior to sealing is a big advantage over the previously known oxygen removal packaging techniques which require relatively slow and complicated machinery for this step. The limiting operation in most existing packaging systems is the time required to establish a predetermined atmosphere within the package prior to sealing. In the instant method, the desired oxygen-free atmosphere may be established shortly after sealing of the package.

Generation of hydrogen within the package can conveniently be accomplished by reacting water and a hydrogen generating agent such as a metal which is found at the top of the electromotive activity series, such as those of potassium, sodium, barium, calcium; metallic hydrides such as those of barium, strontium, aluminum, and calcium; and, certain non-toxic organo-metallic hydrides such as alkyl aluminum dihydride

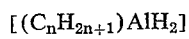

$$[(C_nH_{2n+1})AlH_2]$$

These agents rapidly decompose water at room temperature to liberate hydrogen.

Control of the rate of hydrogen generation can be achieved through selection of a relatively slow-reacting hydrogen generating material such as magnesium aluminum hydride, lithium aluminum hydride and lithium gallium hydride. For the highly reactive alkali and alkaline earth metals and hydrides thereof, control of the hydrogen generation is possible by controlling the supply of water to the highly reactive hydrogen generating agent such as by placing the material in films having known water permeability rates.

Generally, it is desirable to react the hydrogen generating material and the water at a point within the package separated from the product by a physical barrier such as a film. The barrier may serve a double function. It advantageously prevents contact between the product and the hydrogen generating material and its reaction products. Also, the barrier may be used to control the rate of hydrogen generation. In this regard, water may be supplied to the hydrogen generating material at a controlled rate by utilizing as a barrier material films of known water permeability.

Water is used as a reactant in the instant method and should be present within the package prior to the sealing thereof. In packaging most food products such as meats, cheeses, vegetables and fruits sufficient moisture is present in the food product and the head space of the package for the hydrogen generation reaction to proceed without providing additional water. In packaging dehydrated foods and some dry non-food products, insertion of water into the package with provision for eventual contact with the hydrogen generating material is necessary. This water may, of course, be placed in contact with the hydrogen generating material without contacting the product if a dry product is desirable.

Generally, direct physical contact between the product and the hydrogen generating material and its reaction products is advantageously avoided by use of a film or other barrier.

Some hydrogen generating substances produce non-toxic products after reaction with water making the film barrier unnecessary from a toxicity standpoint. For example, the reaction of water and calcium hydride results in calcium hydroxide, and water and magnesium hydride results in magnesium hydroxide. Other desirable hydrogen generating materials react with water to form reaction products which may be rapidly converted to a non-toxic form. In this regard, the products of the reaction of water with calcium hydride results in hydrogen and calcium hydroxide. The calcium hydroxide may be converted to non-toxic calcium ascorbate by reaction with ascorbic acid.

In applications where a long oxygen-free storage life is essential, a plurality of film-enclosed quantities of hydrogen generating material may be used. By varying the time interval of introduction of water to the hydrogen generating material such as by varying the water permeability of the films enclosing the material, successive hydrogen generating reactions can be achieved which periodically remove any oxygen which may be present within the package. This ensures removal of oxygen which may slowly escape from occlusion within certain food products.

The generated hydrogen will react with free oxygen within the package at room temperatures in the presence of certain catalysts to form water. Group VIII–B metals of the third and fourth periods in the periodic table classification system are suitable catalysts for the reaction. Ruthenium, rhodium, platinum and palladium are particularly suitable and are advantageously deposited on an inert carrier such as asbestos, a porous ceramic, or alumina to present a large surface area. These catalysts are commercially available in pellet form deposited on various carrier materials. If a rapid reaction between the oxygen and hydrogen is desired, palladium is the preferred catalyst.

The amount of water formed within a package during the oxygen removal is relatively small in comparison with the amount of water present in most food products. In the packaging of dehydrated food products or certain non-food products it may be desirable to separate the catalyst from the food product with a water impermeable, gas permeable barrier, such as a film of polyethylene. This barrier also aids in preventing contamination of the catalyst by the product or contamination of the product by the catalyst.

Referring to FIGURES 1 and 2, an embodiment of the invention suitable for packaging a sliced, cured lunchmeat product 10 is illustrated. A pouch 12 containing a hydrogen generating material 14, a second pouch 16 containing a catalyst pellet 18, and product 10 hermetically enclosed within a substantially oxygen-impermeable envelope generally 20.

The envelope 20 may comprise a pair of film sheets 22 and 24 with the peripheral portions thereof being thermoplastic for heat sealing. The package of FIGURE 1 was heat sealed along the area 26 after insertion of the illustrated contents into the envelope. Alternatively, the envelope may be a single film sheet formed into a bag.

Particularly suited for use as envelope materials are heat-sealable plastic films and film laminates. These should have an oxygen permeability below about 0.8 cc./100 in.²/24 hr. one atmospheric differential at standard test conditions of 73° F. and 50% relative humidity. If the transmission rate is higher than this, the oxygen entering the package may overcome the removal process. Copolymers of vinylidene and vinyl chloride, polyvinyl alcohol, and coated cellulose fims are noted for their oxygen impermeabiity and may be used as envelope materials either alone or in laminates. In applications where a moist product is being packaged or exposure of the package to moisture is probable, copolymer films and laminates of vinylidene chloride and vinyl chloride are preferred.

Another factor to consider in selecting materials for the envelope or container is the hydrogen permeability thereof. If the hydrogen permeability of the material is too high, generated hydrogen escapes from the package before it can react with all the free oxygen from within the package. Generally, the hydrogen permeability of a film is proportional to the oxygen permeability of the film and is not excessive for this application if the oxygen permeability is below the desired rate, 0.8 cc./100 in.²/24 hr. at standard conditions. Specifically, film with a hydrogen transmission rate of 4 cc./100 sq. in./24 hours/73° F./50% R.H./1 Atmos. D. has been effective. Films or laminates of either aluminum foil or coated cellulose are effective in reducing hydrogen transmission rates and are useful for applications wherein a long oxygen-free storage life is important as they assure a hydrogen-containing atmosphere within the package for long time periods. Metallic containers such as tin cans generally form hydrogen impermeable barriers.

The hydrogen generating material 14 located in proximity to said product is enclosed within a film pouch 12 which forms a barrier to prevent contact with the food product. Moisture from the head space of the cured meat package is utilized in the hydrogen forming reaction so the pouch material is water permeable. Control of the rate of the hydrogen generation can be achieved through use of pouch materials of varying water permeability. This water permeability may be inherent in the film material or minute perforations may be made in the film. For packaging dehydrated products in the instant envelopes it may be desirable to provide a water-impermeable pouch 12 which contains water which may be made available for the reaction with the hydrogen generating material after sealing of envelope 20 to form the package.

The catalyst pellet 18, located in proximity to the product and the hydrogen generating agent, comprises a catalytic material such as palladium, ruthenium, rhodium, or platinum dispersed on an inert carrier having a large surface area-to-volume ratio. The pouch 16 enclosing catalyst 18 utilizes a film barrier to protect the catalyst from fouling by certain chemical groups such as sulfides. This pouch is not necessary to the practice of the instant invention if the product to be packaged does not contain chemical groups which would foul the catalyst and the catalyst does not contaminate the food product. The pouch 16 is necessarily highly oxygen and hydrogen permeable. Films having oxygen transmission rates of 200 cc./100 in.²/24 hr. or more are useful catalyst pouch materials. Films having transmissions of 500 cc./100 in.²/24 hr. or greater are available and are preferred. Since the hydrogen permeability of a film is usually a multiple of the oxygen permeability it has been found that films having oxygen transmission rates at least 200 cc./100 in.²/24 hr. admit hydrogen at a satisfactory rate.

Referring to FIGURE 3 and FIGURE 4, there is illustrated an envelope or container generally 30 of laminated film having a sealed end 32 and an open end 34 for insertion of a product. The envelope includes a relatively thick outside layer 36 of, for instance, a polyester; a middle oxygen barrier layer 38, such as a copolymer of polyvinyl and polyvinylidene chlorides; and an inner oxygen, hydrogen and water permeable layer 40, such as polyethylene.

Near the sealed end of the envelope a pair of enclosed pocket or compartment areas 42 and 44 are formed between inner layer 40 and middle layer 38.

A hydrogen generating agent 46 and a catalyst 48, preferably coated on an inert granular carrier, are enclosed within the pocket areas. The inner layer 40 separates the catalyst and hydrogen generating agent from the interior of the envelope 30 and must be permeable to oxygen, hydrogen and water. This inner film layer serves to prevent contact of the oxygen deteriorative product and the hydrogen generating agent, the catalyst, and the products of the hydrogen generating reaction, thereby precluding contamination of the oxygen-deteriorative product.

The inner layer 30 need not cover the entire inside surface area of the envelope 40. It is convenient to utilize a thermoplastic film for this inner layer for ease of forming and sealing the envelope. Obviously, separate compartments for the hydrogen generating agent and catalyst may be formed of differing film materials. Also, the compartments need not be formed of the film layers making up envelope 30. It is only necessary that the compartments have the required transmission characteristics and within envelope 30. In certain applications it may be advantageous to enclose the hydrogen generating agent in a water permeable film barrier and the catalyst in a water impermeable film barrier. The catalyst film barrier must have an oxygen permeability above 200 cc./100 in.²/24 hr. at standard conditions.

The amount of hydrogen generating agent required in a package varies with the size of the package, the amount of free oxygen in the package, and the oxygen permeability of the envelope material. The hydrogen generating agent must be capable of producing hydrogen in quantities at least twice the volume of the free oxygen present within the package at the time of sealing. Consumer packages of retail luncheon meats containing from about four to eight ounces of product can be rendered oxygen free by as few as 0.0014 gram of calcium hydride, one of the usable hydrogen generating materials. Larger package sizes require increased amounts of hydrogen generating material, unless evacuation or flushing of the package is performed prior to sealing.

Very small amounts of catalyst may be utilized. In packages wherein circulation of the enclosed gas is relatively free, a single pellet as illustrated in FIGURE 1 may be sufficient. In packages wherein pockets of air are separated from each other by product each gas pocket should be in contact with some catalyst. In such packages the catalyst is advantageously distributed along the inner wall of the package. Ordinarily free movement of hydrogen and oxygen to the catalyst is possible in film packages because of the tendency of the generated hydrogen to expand or puff the film package to a larger volume.

The following examples illustrate the advantages of this invention. In these examples the effect of oxygen on cured meat products packaged according to different methods is shown.

Example I

Sliced bologna in six ounce portions and sliced dried beef in three ounce portions were each packaged using three different procedures in a laminated film envelope (polyethylene terephthalate 0.5 mil, vinylidene chloride-vinyl chloride copolymer 0.1 mil, and low density polyethylene 2.0 mils). A control package of each product was formed by simply inserting the product into the film envelope and sealing without vacuumizing or flushing. A second pair of envelopes made of the same film wrapper was sealed after vacuumizing to 28 in. Hg. A third pair of packages was packaged according to the method of the present invention; namely, a 30# sulphate paper packet containing about 0.1 gram of calcium hydride and a 30# sulphate paper packet containing about 0.1 gram of commercially available palladium catalyst pellets was inserted into an envelope containing six ounces of bologna.

A packet containing about 0.1 gram of calcium hydride and about 0.1 gram of commercially available palladium pellets was inserted into the package containing about three ounces of cured dried beef. Water was added to the dried beef envelope by moistening the corner of the paper packet containing the hydride. These envelopes were then sealed without flushing or vacuumizing. Within 60 minutes after packaging, all three sets of packages were exposed to light of sixty foot candle intensity and 40° F. temperatures, which are average display conditions for non-frozen meats. Color of the bologna and beef in the control package had faded noticeably at the end of four hours. Fading also occurred on product at the edges of the vacuum packages within four hours. The packages containing the catalyst and hydrogen generating agent showed no fading at the end of four hours and fading was not apparent at the end of 48 hours of storage.

Example II

Sliced combination loaf (half chopped ham and half processed cheese) in six ounce portions was placed in envelopes formed of 210K204 cellophane coated with 2 mils of low density polyethylene, which has an oxygen permeability of below about 0.8 cc./100 sq. in./24 hours/ 73° F./50% R.H./1 Atmos. D. Into these envelopes the following combinations of catalyst and hydrogen generating agents were inserted:

(a) 0.05 gram of sodium boro hydride (hydrogen generating material) in a pouch made of a paper front panel and cellophane back panel.

(b) 0.014 gram of palladium or alumina catalyst which was inserted in pellet form into the envelope (enclosed in a pouch made of a paper front panel and cellophane back panel having an oxygen permeability of above 500 cc. $O_2$/100 sq. in./24 hours/73° $F_o$/50% R.H./1 Atmos. D.).

The envelopes were then heat sealed. Within 30 minutes after heat sealing, the packages were exposed to light of 60 foot candle intensity and about 40° F. temperatures. No color fading was observed at the end of four hours and 24 hours, and there was no noticeable fading at the end of 48 hours.

Obviously, products may be packaged in containers other than flexible films in accordance with the invention since the basis of the invention lies in generating enough hydrogen within a sealed container to combine with all free oxygen within the container. The amount of hydrogen generating material inserted should not greatly exceed the amount required to react with the free oxygen in a hydrogen impermeable container or excessive pressures may develop.

Obviously, many modifications and variations of the invention as set forth may be made without departing from the spirit and scope thereof, and therefore only such limitations should be imposed as are indicated in the appended claims.

We claim:
1. A process for producing a package protected against oxygen-induced product deterioration comprising: introducing into an envelope of substantially oxygen impermeable film, a food product, a small amount of water and a catalyst capable of combining hydrogen and oxygen at room temperatures to form water; introducing into said envelope a hydrogen generating agent enclosed within a water permeable and hydrogen permeable film, whereby said agent is separated from said food product; sealing said envelope to form a substantially oxygen-impermeable package; whereby sufficient hydrogen gas in generated within said package by the reaction of said hydrogen generating agent and said water to react with all oxygen contained within said package, and whereby the hydrogen gas and free oxygen combine in the presence of said catalyst to form water.

2. The process of claim 1 wherein the metallic agent is selected from the group consisting of calcium hydride, aluminum hydride, magnesium hydride, magnesium aluminum hydride, and lithium gallium hydride.

3. The method of claim 1 wherein the metallic agent is calcium hydride.

4. An envelope adapted to form packages about oxygen-deteriorative products comprising: a heat-sealable packaging sheet material having an oxygen permeability of less than 0.8 cc./100 in.$^2$/24 hr., said sheet forming an envelope into which a product may be inserted; a water permeable, hydrogen permeable film within said envelope and forming a compartment therein; a small amount of a hydrogen generating agent enclosed within said compartment; a second film compartment within said envelope formed by a film having an oxygen permeability of at least 200 cc./100 in.$^2$/24 hr.; and a small amount of a catalyst for the reaction of hydrogen and oxygen at room temperatures, said catalyst enclosed within said second compartment.

5. A process for producing packages protected against oxygen-induced deterioration of food products comprising: forming a flexible film envelope having an oxygen transmission rate below about 0.8 cc./100 in.$^2$/24 hr. at standard conditions; inserting a moisture-containing food product and a catalyst for the reaction of hydrogen and oxygen at room temperatures into said envelope; inserting into said envelope a hydrogen generating agent enclosed within a water permeable and hydrogen permeable film, whereby said agent is separated from said food product; hermetically sealing said envelope to form a package; whereby sufficient hydrogen gas is generated within said package by the reaction of said hydrogen generating agent and said moisture to react with all oxygen contained within said package; and whereby the generated hydrogen combines with free oxygen present within said package in the presence of said catalyst to form water.

6. A food package protected against oxygen-induced deterioration comprising: a hermetically sealed, substantially oxygen-impermeable container; a water-containing, oxygen-deteriorative food product enclosed within said container; a water permeable, hydrogen permeable film within said container and forming a compartment therein; a small amount of a water activatable hydrogen generating agent enclosed within said compartment; a second film compartment within said container formed by a film having an oxygen permeability of at least 200 cc./100 in.$^2$/24 hr.; and a catalyst for the reaction of hydrogen and oxygen at room temperatures, said catalyst enclosed within said second compartment.

References Cited

UNITED STATES PATENTS

| | | | |
|---|---|---|---|
| 2,789,059 | 4/1957 | Lindewald | 99—171 |
| 2,826,598 | 3/1958 | Ziegler et al. | 260—448 |
| 3,246,959 | 4/1966 | Brewer | 23—282 |
| 3,255,020 | 6/1966 | Ferrell | 99—171 |

OTHER REFERENCES

Fieser et al., Organic Chemistry, 3rd ed., p. 117 (1956).

A. LOUIS MONACELL, *Primary Examiner.*

E. A. MILLER, *Assistant Examiner.*

U.S. Cl. X.R.

21—61; 23—282; 99—174, 189; 206—47